Dec. 29, 1925.  N. G. CEDILLO  1,567,491
TRANSMISSION MECHANISM
Filed Jan. 17, 1924    3 Sheets-Sheet 1
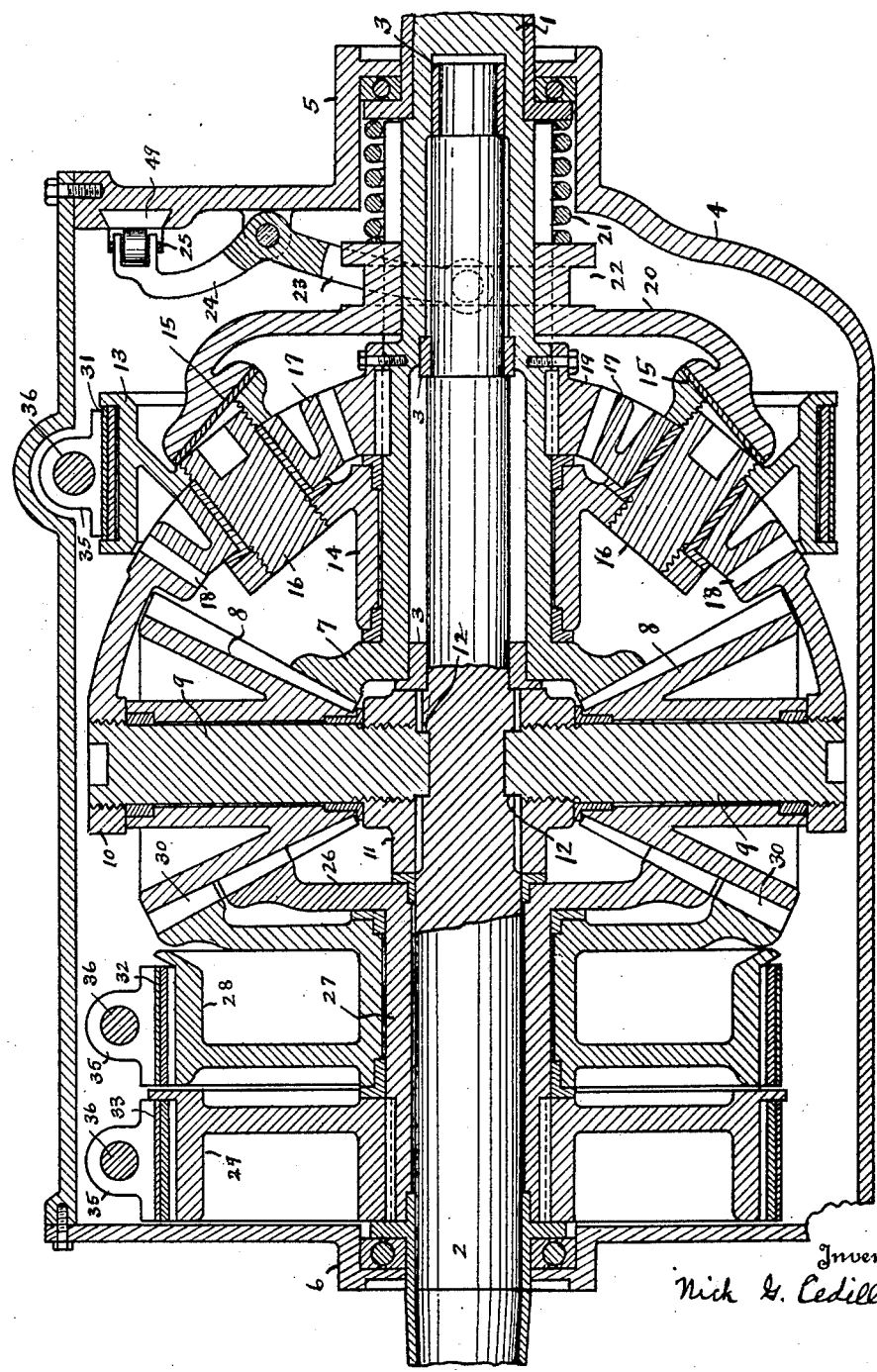

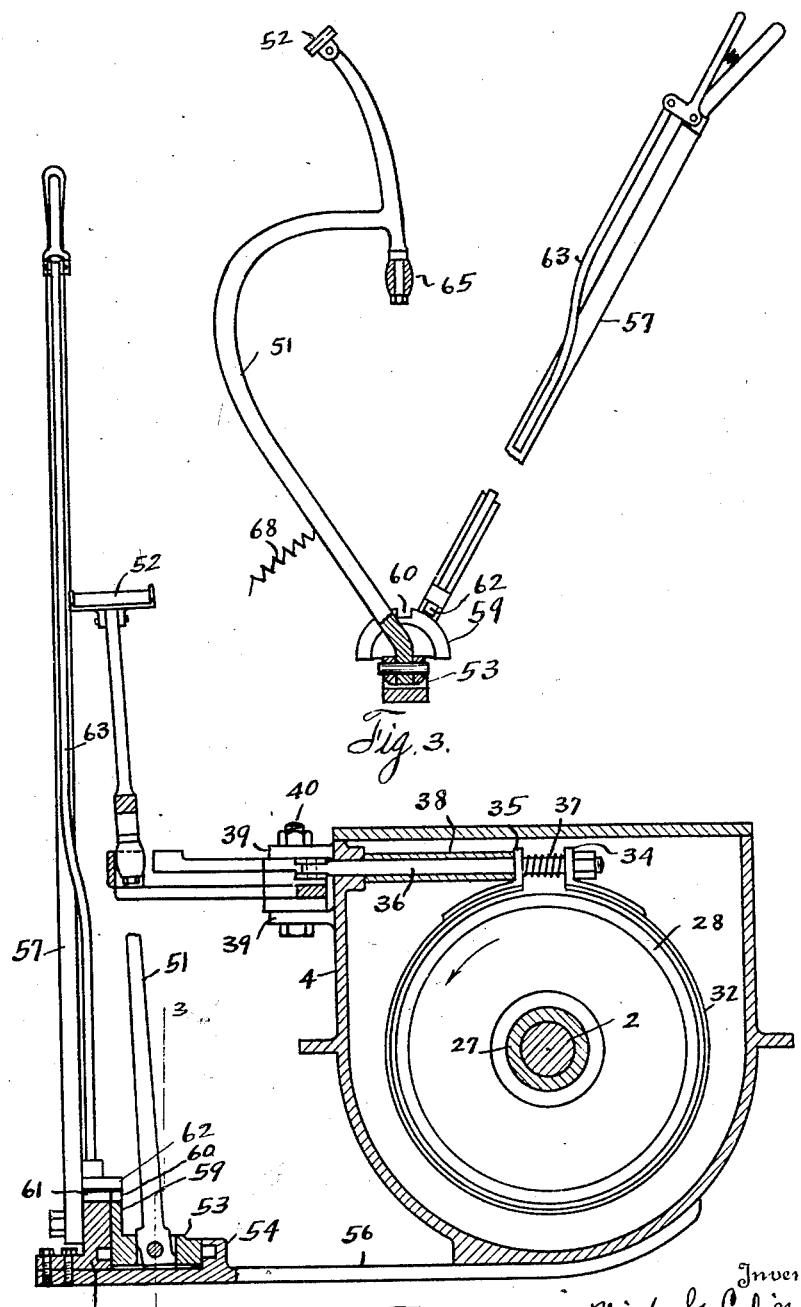

Dec. 29, 1925.

N. G. CEDILLO 1,567,491

TRANSMISSION MECHANISM

Filed Jan. 17, 1924  3 Sheets-Sheet 3

Inventor
Nich. G. Cedillo

By Hardway Toth
Attorneys

Patented Dec. 29, 1925.

1,567,491

UNITED STATES PATENT OFFICE.

NICK G. CEDILLO, OF HOUSTON, TEXAS.

TRANSMISSION MECHANISM.

Application filed January 17, 1924. Serial No. 686,701.

*To all whom it may concern:*

Be it known that I, NICK G. CEDILLO, a citizen of the United States, residing at Houston, in the county of Harris and State of Texas, have invented certain new and useful Improvements in a Transmission Mechanism, of which the following is a specification.

This invention relates to new and useful improvements in a transmission mechanism.

One object of the invention is to provide a very simple type of transmission through which a plurality of driving relations may be established between a driving member and a driven member without the necessity of shifting any of the gears of the transmission.

Another object of the invention is to provide an improved type of transmission mechanism through which a plurality of driving relations may be established between a driving member and a driven member by the manipulation of a simple controlling lever and without the necessity of shifting any of the transmission gears.

A further feature of the invention is to provide a transmission mechanism of the character described equipped with means for locking the same in neutral or non-driving position.

A still further feature of the invention resides in the provision of a transmission mechanism which is of very simple construction and may be cheaply and easily manufactured and which is very durable and efficient in use.

With the above and other objects in view, the invention has particular relation to certain novel features of construction, operation and arrangement of parts, an example of which is given in this specification and illustrated in the accompanying drawings, wherein:—

Figure 1 shows a longitudinal sectional view of the transmission.

Figure 2 shows a transverse sectional view thereof.

Figure 3 shows a vertical sectional view taken on the line 3—3 of Figure 2; and, Figure 4 shows a plan view, partly in section.

Figure 4:
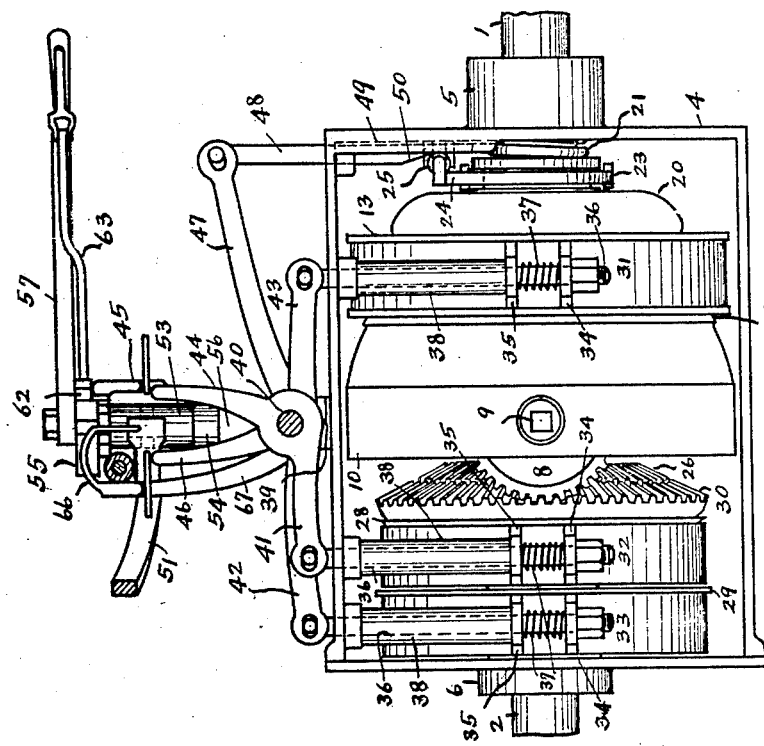

Referring now more particularly to the drawings, wherein like numerals of reference designate similar parts in each of the figures, the numerals 1 and 2, designate the driving and the driven shaft, respectively. The end of the driven shaft adjacent the driving shaft is reduced and telescopes in the end of the driving shaft and rotates in suitable ring-like bearings as 3 therein. The transmission gearing is enclosed by a suitable housing 4, having end bearings 5 and 6, in which the respective driving and driven shafts rotate. The inner end of the driving shaft is formed into a bevel gear 7 which is in mesh with the oppositely disposed pinions 8, 8, which are rotatably mounted on the radial pins 9, 9. There is a ring gear 10 which has a hub 11 on the driven shaft 2, and the pins 9 are anchored in this ring gear with their outer and inner ends threaded through the rim and hub, respectively, thereof, said inner ends projecting into opposing sockets 12, in the driven shaft and thereby fixing the ring gear 10 to said shaft.

A brake drum 13 is provided and formed with a hub 14, which is rotatable on the driving shaft. This drum has an annular cone face 15 and carries oppositely disposed diverging bearing pins 16, 16, on which rotate the bevel pinions 17, 17. These pinions are in mesh, on one side, with the bevel gear face 18, carried by the ring gear 10, and on the other side they are in mesh with the bevel pinion 19, which is keyed on the shaft 1. There is a cone locking member 20 splined on the driving shaft 1, and interposed between the hub of said locking member and the bearing 5, and surrounding said shaft 1, there is a coil spring 21 which normally holds said clutch member in frictional engagement with the cone face 15. The hub of the locking member 20 has an annular groove 22 and a bifurcated yoke 23 is pivoted to the inner side of the adjacent end of the housing 4 and its fingers work in said groove 22. The yoke has an extended arm 24 whose free end carries the roller 25.

Rotatably mounted on the driven shaft there is a bevel gear 26 which is in mesh with the pinions 8, and has an extended bearing 27, on said shaft. Rotatably mounted on this extended bearing there is a brake drum 28 and keyed thereon there is a brake drum 29. The drum 28 is formed with an integral bevel gear face 30 in mesh with the pinions 8.

The drums 13, 28 and 29 have the respective brake bands 31, 32 and 33, surrounding the same. The ends of these bands are formed with upturned spaced lugs 34, 35. Fastened to the lugs 34 and extending through aligned bearings in the lugs 35, are the respective brake rods 36, and surrounding these respective rods between the corresponding lugs are the respective coil springs 37. The rods 36 slide through sleeves, as 38, which are interposed between the respective lugs 35 and the opposing side of the housing 4. This side of the housing has the outstanding ears 39, 39, spaced apart, one above the other, and anchored to these ears there is a bearing pin 40.

The levers 41, 42 and 43 have bearings on said pin 40 and the free ends of these levers are pivotally connected to the outer ends of the respective brake rods 36. These levers have integral outwardly extending arms 44, 45 and 46, respectively.

There is also a lever 47 which has a bearing on the pin 40 and whose free end is pivoted to the release bar 48. This bar works in a keyway 49 and has its free end beveled, as at 50, and is disposed to run under the roller 25 to actuate the yoke 23 in order to release the locking member 20.

The numeral 51 designates a pedal lever whose upper end carries the pedal 52. The lower end of this lever is pivoted for lateral movement in the bearing 53, and this bearing is pivoted to move, or rock, forwardly and rearwardly in the lugs 54, 55, thus providing a universal movement for lever 51. These lugs 54, 55, are anchored with respect to the housing 4 by means of any suitable anchor, as 56.

Pivoted to the lug 55 there is a manual lever 57, which carries a suitable rack and dog arrangement by means of which the lever 51 may be locked in fixed position, to hold the transmission mechanism in neutral position. This rack and dog arrangement includes the semi-circular rack 59, formed integrally with the bearing 53, and having the notch 60 in the upper edge thereof aligned with a similar notch 61 in the lug 55, and the dog 62 arranged to be seated in said notches, or releeased, through the operating rod 63.

The pedal lever 51 carries a depending roller bearing 65 provided to actuate the arms of the shifting levers 41, 42, 43 and 47.

As shown in Figure 4 the transmission is in third speed ahead, the bar 48 being released from underneath the roller 25 permitting the locking member 20 to engage. This forces the drum 13 to rotate with the driving shaft and rotation is imparted through the pinions 17 and the ring gear 10 to the driven shaft, a direct drive thus being obtained. The pedal 52 may now be forced forwardly to engage the roller bearing 65, against the forwardly curved finger 66 of the arm 67; and this will operate to force the clutch release bar 48 underneath the roller 25, thus releasing the clutch 20. The transmission is now in neutral and may be shifted to any desired speed. In order to obtain first speed, or low, the lever 51 is shifted to bring its roller 65 into engagement with the arm 44, and then moved forwardly to set the brake band 32 on the drum 28. This will lock the drum 28 and the gear face 30 carried thereby and rotation will be imparted from the driving shaft through the pinions 7 and 8, around the bevel face 30. If the pedal lever be now shifted to operate the arm 45, the brake band 33 will be set on the drum 29, through the mechanism described and rotation will be imparted from the driving shaft through the same train of gears as the first speed around the bevel gear 26. For reverse the pedal lever is shifted to actuate the arm 46 to set the brake band 31 on the drum 13. This will operate to hold said drum against rotation and the rotation of the driving shaft will be imparted, through the pinions 19 and 17, and the ring gear 10, to the driven shaft in a reverse direction.

The pedal lever 51 may be easily shifted forwardly for first or second speed by the foot of the operator, but for third speed or reverse the pedal lever is shifted to engage the roller bearing 65 against the arm 67, or the arm 46 as the case may be, and then released and the spring 68 will then operate the pedal lever to establish the desired gear connection. This spring is attached at its forward end to the pedal lever, and at its rear end is attached to some suitable anchor in the rear of said pedal lever.

In order to lock the transmission in neutral the lever 51 is shifted to align the notch 60 with the notch 61, and the lever 57 is then manipulated to seat the dog 62 in said notches, and the transmission is thus locked in neutral against shifting until said dog is released.

What I claim is:—

1. A transmission mechanism including a driving member, a driven member, an annular member fixed on the driven member, a pinion mounted to rotate on a radial axis, on said annular member, a plurality of bevel gears loosely mounted on said driven member, a bevel gear fixed on said driving member and in mesh with said pinion, brake mechanism associated with said respective loosely mounted bevel gears through which the same may be locked against rotation, and released, alternatively, a train of gears operatively connecting the driving member with said annular member, a loosely mounted carrier on the driving member on which one gear of said train is mounted to rotate, brake mechanism associated with said carrier through which the same may be locked against rotation and released, means for locking said carrier to rotate with the driving member, and means for releasing said locking means.

2. A transmission mechanism including a driving member, a driven member, an annular member fixed on the driven member, a pinion mounted to rotate on a radial axis, on said annular member, a plurality of bevel gears loosely mounted on said driven member, a bevel gear fixed on said driving member and in mesh with said pinion, brake mechanism associated with said respective loosely mounted bevel gears through which the same may be locked against rotation, and released, alternatively, a train of gears operatively connecting the driving member with said annular member, a loosely mounted carrier on the driving member on which one gear of said train is mounted to rotate, brake mechanism associated with said carrier through which the same may be locked against rotation and released, means for locking said carrier to rotate with the driving member, and means for releasing said locking means, and a locking device operatively connected with said brake mechanisms, and said locking means through which they may be locked in inactive or neutral position.

3. A transmission mechanism including a driving member, a driven member, a plurality of bevel gear wheels fixed on one of said members, an annular carrier loosely mounted on said member and formed with a friction face, and a clutch splined on said member and adapted to co-act with said friction face, a ring gear fixed on the other member and a plurality of bevel gears loosely mounted on said other member, a pinion mounted to rotate on a radial axis on said ring gear and in mesh with said loosely mounted gears, and also in mesh with one of said fixed bevel gear wheels, a pinion mounted on said carrier and in mesh with said ring gear and also in mesh with the other fixed bevel gear wheel, brake mechanisms associated with said carrier and with said loosely mounted bevel gears, respectively, means for setting or releasing said respective brake mechanisms, alternately.

4. A transmission mechanism including a driving member, a driven member, a plurality of bevel gear wheels fixed on one of said members, an annular carrier loosely mounted on said member and formed with a friction face, and a clutch splined on said member and adapted to co-act with said friction face, a ring gear fixed on the other member and a plurality of bevel gears loosely mounted on said other member, a pinion mounted to rotate on a radial axis on said ring gear and in mesh with said loosely mounted gears, and also in mesh with one of said fixed bevel gear wheels, a pinion mounted on said carrier and in mesh with said ring gear and also in mesh with the other fixed bevel gear wheel, brake mechanisms associated with said carrier and with said loosely mounted bevel gears, respectively, means for setting or releasing said respective brake mechanisms, alternately, a yieldable member normally tending to hold said clutch in frictional engagement with said friction face, and means for releasing said clutch from said friction face.

In testimony whereof I have signed my name to this specification.

NICK G. CEDILLO.